United States Patent [19]
Johnson

[11] Patent Number: 5,876,645
[45] Date of Patent: Mar. 2, 1999

[54] IMPREGNATION OF LINERS

[75] Inventor: Alexander Charles Edward Johnson, Tockwith, Great Britain

[73] Assignee: Applied Felts Limited, Wakefield, United Kingdom

[21] Appl. No.: 654,389

[22] Filed: May 28, 1996

[30]    Foreign Application Priority Data

Jun. 17, 1995 [GB] United Kingdom .................... 9512369

[51] Int. Cl.⁶ .............................. B05D 3/00; B29C 63/34; F16L 55/16
[52] U.S. Cl. ............................ 264/102; 138/97; 138/141; 156/87; 156/155; 156/294; 264/269; 264/313; 427/238; 427/294; 427/296; 428/36.2
[58] Field of Search ................................. 156/87, 94, 155, 156/286, 287, 294; 138/97, 98, 141; 264/36.16, 36.17, 102, 269, 313, 516, 571, 573, DIG. 78; 427/140, 238, 294, 296; 428/36.1, 36.6

[56]                References Cited

U.S. PATENT DOCUMENTS

| | | | |
|---|---|---|---|
| 3,827,130 | 8/1974 | Baumann | 264/269 |
| 4,009,063 | 2/1977 | Wood | 156/294 |
| 4,182,262 | 1/1980 | Everson et al. | 156/294 |
| 4,366,012 | 12/1982 | Wood | 156/287 |
| 5,354,586 | 10/1994 | Yokoshima et al. | 156/287 |
| 5,549,856 | 8/1996 | Yokoshima | 156/287 |
| 5,699,838 | 12/1997 | Catallo et al. | 264/269 |
| 5,794,663 | 8/1998 | Kiest et al. | 264/269 |

*Primary Examiner*—Steven D. Maki
*Attorney, Agent, or Firm*—Jenkins & Wilson, P.A.

[57]    ABSTRACT

A tube which is normally in a collapsed position and which has an inner layer, suitably of felt. The free end of the tube is pulled apart and a pool of resin is located within the tube. Opposed driven rollers then pull the free end of the tube to assist in the dispersion of the resin in the felt. To assist in the resin impregnating the felt a vacuum is applied to urge the felt on either side of the collapsed tube so that the sides are more towards each other in the region of the pool of resin. In order for the vacuum to be able to be applied in the region of the pool of resin the vacuum is applied to the trailing end of the tube and an insert comprising a strip of material that is less prone to collapse than the felt of the tube is located along the inside of the felt. Thus, even though the felt may compress to a relatively higher degree thereby inhibiting the passage of the vacuum along the tube through the felt, the stiffer material of the insert still allows the vacuum to be pulled along the length of the tube.

30 Claims, 2 Drawing Sheets

IMPREGNATION OF LINERS

BACKGROUND OF THE INVENTION

The present invention relates to a hollow elongate liner, a method of impregnating an absorbent layer of a hollow elongate liner and a method of lining a pipe using an elongate liner.

DESCRIPTION OF THE PRIOR ART

In the lining of pipe lines and passageways a flexible tube is provided that has an impervious layer surrounding an inner layer of felt. The felt is impregnated with resin that can be cured under an exothermic reaction and the tube is everted in order to get the tube to extend along inside a passageway with the impregnated felt layer outermost. Water is then located in the tube and heated to cause the exothermic reaction in the resin to thereby harden the resin to line the pipe. There is a problem though in impregnating the felt layer with the resin as the felt layer contains approximately 90% air. Accordingly, in order to remove the air and assist in the impregnation of the resin, air is evacuated from within the liner. However, as the air is evacuated the impervious outer wall of the liner collapses and the felt layer is compressed by the atmospheric pressure from outside of the liner. The compression of the liner tube results in the vacuum failing to be adequate at a distance from where the vacuum is applied.

U.S. Pat. No. 4,366,012 (Wood) describes a method of absorbing resin into a layer in a lining tube having an impermeable outer layer. That method comprises applying a vacuum through a hole in the impermeable layer just downstream of the region where the resin is permeating the layer. However repeated holes have to be made along the length of the liner to ensure that the vacuum is applied adjacent to the region where the resin is located and those holes have to be repaired to be made impermeable again. If the vacuum is applied too far from the region of the resin then the permeable layer compresses to such an extent that the vacuum never reaches the region where the resin is impregnating the layer.

It is an object of the present invention to attempt to overcome at least some of these disadvantages.

SUMMARY OF THE INVENTION

According to one aspect of the present invention a hollow elongate liner includes an outer impervious layer and an inner absorbent layer, the liner including an elongate portion extending along the liner within the impervious layer, the elongate portion being pervious and having a greater resistance to compression than said absorbent layer.

With such an elongate liner the elongate portion allows a vacuum to be applied along a significant length from where the vacuum is applied as the air can be withdrawn along the elongate portion even whilst the relatively compressible absorbent layer is held in a significantly compressed state by the atmospheric pressure.

The elongate portion may comprise a hollow tube having a plurality of openings along its extent. The tube may be a flexible tube. The tube may be of Polyurethane (Pu) or polyvinylchloride and that plastics may lack the usual stabiliser.

The elongate portion or tube may be dissolvable in styrene. The tube may be compressible under heat. The tube may be arranged to melt at a temperature below that at which the absorbent layer melts.

The elongate portion may comprise a fibrous portion. The fibrous portion may be of 10 to 150 Denier and may be in the region of 15 to 90 Denier. The fibrous portion may comprise needled fibre. The fibrous portion may comprise a bonded fibrous portion. The bond may be dissolvable, for instance in styrene. The fibrous portion may be dissolvable, for instance in styrene.

The fibrous portion may be arranged to melt at a lower temperature than the absorbent layer.

The fibrous portion may be ribbed and the ribs may extend in the elongate direction of the liner.

The elongate portion may have a lesser extent in a direction transverse to the elongate extent of the liner than the same transverse extent of the absorbent portion.

The elongate portion may be welded or bonded to the absorbent portion.

According to a second aspect of the present invention a method of impregnating an inner absorbent layer of a hollow elongate liner having an outer impervious layer comprises removing air within the liner from one end region of the liner through an elongate portion extending along the liner and within the liner such that resin located within the liner away from said one end of the liner may more easily impregnate the absorbent layer.

The method may comprise dissolving at least a part of the elongate portion in the resin. The part that may be dissolved may comprise a bond that holds fibers of the elongate portion together. The method may comprise dissolving fibers of the elongate portion in the resin.

The method may comprise causing relative movement of the resin and the liner such that the resin moves along, relative to the liner, towards said one end region.

The method may comprise impregnating an absorbent layer of a hollow elongate liner substantially as herein referred to.

According to a third aspect of the present invention a method of lining a pipe using an elongate liner as herein referred to comprises reducing the thickness of the elongate portion when the liner is laid.

The method may comprise reducing the thickness of the elongate portion by pressure. Alternatively or additionally the method may comprise reducing the thickness of the elongate portion by weakening the resistance of the elongate portion to pressure by heating. Alternatively or additionally the method of reducing the thickness of the elongate portion may comprise melting the elongate portion. Alternatively or additionally the material may be chemically attacked.

The present invention includes any combination of the herein referred to features or limitations.

BRIEF DESCRIPTION OF THE DRAWINGS

The present invention may be carried into practice in various ways but one embodiment will now be described, by way of example and with reference to the accompanying drawings, in which.

DETAILED DESCRIPTION OF PREFERRED EMBODIMENTS

Figure 1:
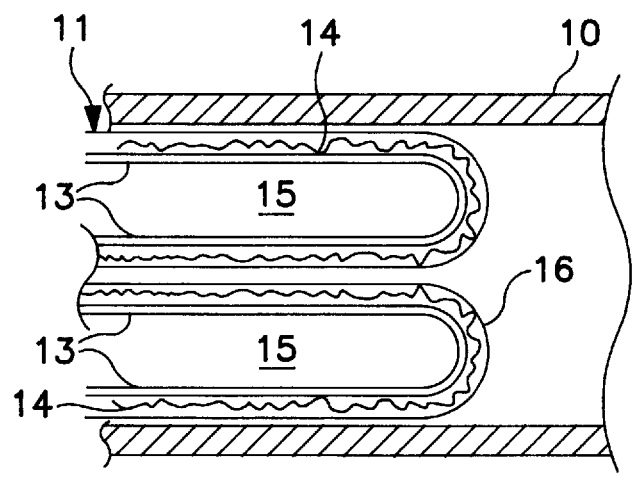
FIG. 1 is a cross-section through part of a pipe 10 that is being lined by everting a tube 11.
Figure 2:
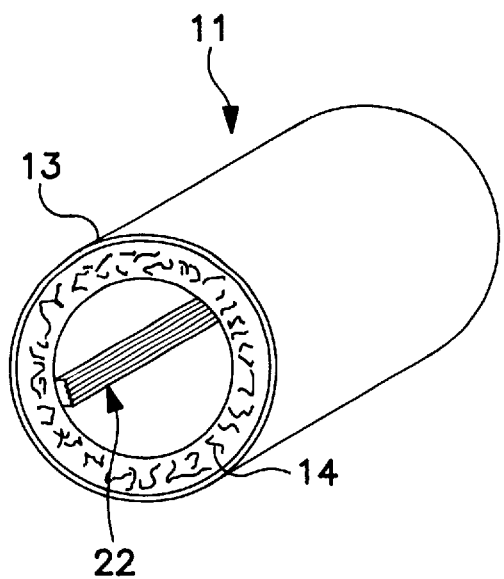
FIG. 2 is a schematic perspective view of the end of the tube 11.

As shown in FIGS. 1 and 2, the tube 11 comprises an outer skin 13 that is impermeable and an inner layer of felt 14 that is impregnated with resin.

In use, in order to line the pipe 10, the tube 11 is inserted into the passageway or pipe 10 with one end of the tube extending back within itself such that the impervious skin 13 defines a cavity 15. Water is fed into the cavity 15 and pressurised in order to push the end 16 along the pipe thereby urging the felt 14 against the surface of the pipe and laying more felt along the surface of the pipe by causing the tube to be everted.

When the tube is in the required position, the water in the cavity 15 is heated. This causes the resin in the felt to undergo an exothermic reaction that results in the tube subsequently hardening thus creating a new, sealed structural layer for the pipe.

The above technology is now well known. There is, however, a problem in getting the resin to permeate into the felt without there being a significant amount of air. In this respect, approximately 90% of the volume of the unimpregnated felt is air.

Figure 3:
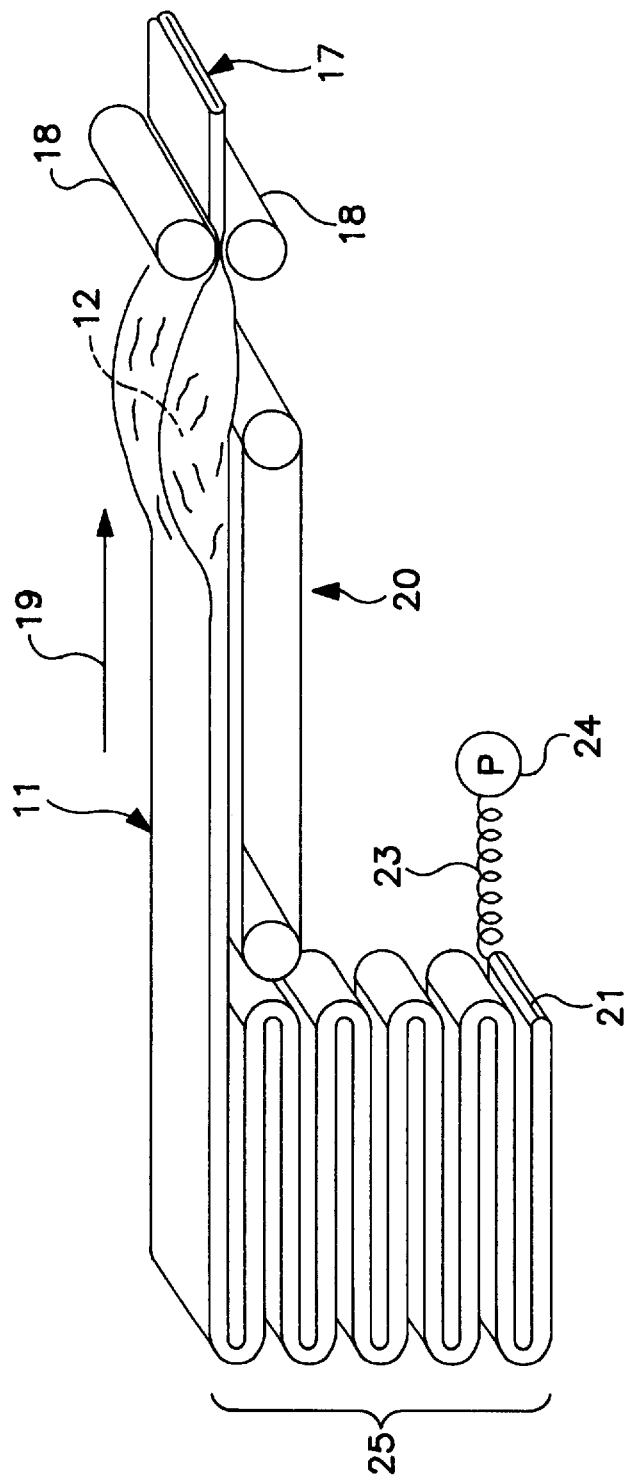
FIG. 3 is a schematic view of the tube 11 whilst the tube is being impregnated with resin 12.

Prior to the tube being installed, the walls of the tube are not sufficiently strong to hold the tube in the cylindrical position shown in FIG. 2 and, in practice, the tube will be in the collapsed position shown at the open end 17 of the tube in FIG. 3 with the opposed internal walls of the felt in contact with each other.

In order to impregnate the tube with resin, the free end of the tube is pulled apart and a pool of resin 12 is located within the tube. Opposed driven rollers 18 then pull the free end of the tube through in the direction of arrow 19 to assist in the dispersion of resin in the felt and to limit the amount of resin that is able to leave the pool 12. Ideally the pool will be nearing exhaustion when all of the felt in a length of tube has been impregnated. The driving force required to feed the tube is assisted by a conveyor belt 20 for the tube prior to and up to the rollers 18.

In order to assist in the resin impregnating the felt a vacuum is applied to urge the felt on either side of the tube more towards each other in the region of the pool of resin 12. In order for that vacuum to be able to be applied in the region of the pool of resin it has previously been proposed to cut a small hole in the skin 13 just prior to the pool and to attach a suction cup to the hole to draw the air out. This causes the tube to collapse completely and allows the resin to impregnate the felt without any significant amount of air being trapped in the felt. The cup is then removed and the opening in the skin is sealed. Similar suction points are made in the tube at regular intervals. The steps of cutting the holes, applying the suction force and then resealing the holes are however time consuming.

Furthermore the sealing of some impervious layers can only be done by thermally welding the skins. The application of that heat can be disasterous for the liner as the resin can be thermally activated thereby setting off its exothermic reaction and rendering the liner useless. Indeed many of the skins that are used are specifically chosen to have chemical resistant properties thereby rendering them unsuitable for chemical sealing of the suction openings and leaving the only sealing option as the undesirable thermal welding.

Ideally the vacuum should be applied to the trailing end 21 of the tube 11. However, as the tube is bent back on itself repeatedly in a serpentine section 25, and as the opposed parts of the impervious skin move to be very closely adjacent to each other thereby crushing the felt (which may be in the region of 6–15 Denier), that suction force is not able to be conveyed to any great extent along the length of the tube.

In order to enable air to be withdrawn along the length an insert 22 is located within and along the tube on the internal face of the felt 14.

The insert 22 only extends around a small proportion of the circumference of the tube. However, the function of the insert is to maintain a small passageway along the length of the hose, even when the hose is folded as at the section 25, to enable the reduced pressure to be applied along the complete length of the tube, without a significant pressure drop, even though the length may be 100 m or more. Thus a single extendable suction pipe 23 at the end 21 of the hose can have air withdrawn by a pump 24 in order to evacuate most of the air from the felt.

The vacuum is applied to the hose as the hose passes through the pool of resin and need only be detached as the last part of the hose reaches or passes the pool.

The insert 22 can be a pipe having a plurality of openings along its length with the pipe being strong enough and flexible enough to enable the air to be drawn out, even along the folded section 25. The pipe could be pulled out during the eversion of the hose during installation. Alternatively when the resin undergoes curing due to the exothermic reaction on installation of the hose, the material of the pipe could be such that the heat softens the pipe sufficiently to enable the pipe to be crushed flat against the wall of the passage being lined or, indeed, the exothermic temperature could be such that the pipe melts as a result of that curing temperature. As a further alternative, the pipe could be made of a material that is softened or attacked by the styrene in the pool of resin such that the pipe is dissolved or caused to disintegrate at the pool.

The pipe may be made of polyvinylchloride or Pu that may have the traditional stabilisers removed to assist in the ready softening, melting or dissolving of the pipe.

In a further alternative, the insert may comprise a strip of material that is less prone to collapse than the felt 14 of the tube. For instance the insert may comprise a strip of material having a higher Denier than the felt such as a fibrous needle felt. Alternatively or additionally the strip may be a ribbed strip with the valleys between the ribs assisting in the withdrawal of air along the tube. Alternatively or additionally the insert may have fibers that are connected or bonded together such as by latex. Such connected fibers are less prone to collapse and readily allow the suction force to be applied along the length of the tube.

When the insert reaches the pool of resin the bond in the material or the material itself may be arranged to be dissolved by the styrene thereby causing the insert to collapse at that time or to permit the resin to permeate the insert. The latex comprising the bond of the insert may be a latex resin having a low resistance to aromatic hydrocarbons such as styrene—butadiene latex. Alternatively or additionally the insert may be arranged to have the bonded fibers detached or the fibers melted under the exothermic reaction that occurs during curing of the resin. Again as an alternative or an addition any of the inserts may be attached chemically whilst the liner is located in a passageway.

By reducing the insert or causing it to collapse there is no opportunity for the water to be conducted along the insert when a pipe has been laid.

The insert may comprise a needled felt such as a polypropylene felt, for example a needle punch carpet. The insert may have a Denier in the region of 10 to 150 or be a blend of fibers of differing Deniers. For instance the blend may be of 15 and 90 Denier fibers.

The insert may be connected to the felt of the tube such as by adhesion that may include latex or by welding.

What I claim is:

1. A hollow elongate liner including an outer impervious layer, an inner absorbent layer and an elongate portion, the elongate portion extending along the liner within the impervious layer, the elongate portion being pervious and having a greater resistance to compression than said absorbent layer and at least part of the elongate portion being dissolvable in styrene.

2. A liner according to claim 1 in which the elongate portion comprises a hollow tube having a plurality of openings along its extent.

3. A liner according to claim 2 in which the tube is a flexible tube.

4. A liner according to claim 3 in which the tube is of polyurethane.

5. A liner according to claim 4 in which the polyurethane lacks stabiliser.

6. A liner according to claim 3 in which the tube is of polyvinyl chloride.

7. A liner according to claim 6 in which the polyvinyl lacks stabiliser.

8. A liner according to claim 2 in which the tube is compressible under heat.

9. A liner according to claim 2 in which the tube is arranged to melt at a temperature below that of which the absorbent layer is arranged to melt.

10. A liner according to claim 1 in which the elongate portion has an extent in a direction transverse to the elongate extent of the liner and the absorbent layer has an extent in a direction transverse to the elongate extent of the liner, and the extent of the elongate portion is less than the extent of the absorbent layer.

11. A liner according to claim 1 in which the elongate portion is welded to the absorbent layer.

12. A liner according to claim 1 in which the elongate portion is bonded to the absorbent layer.

13. A liner according to claim 1, in which the elongate portion comprises a fibrous portion.

14. A liner according to claim 13 in which the fibrous portion is of 10 to 150 Denier.

15. A liner according to claim 13, in which the fibrous portion is in the region of 15 to 90 Denier.

16. A liner according to claim 13 in which the fibrous portion comprises needled fibre.

17. A liner according to claim 13 in which the fibrous portion comprises a bonded fibrous portion comprising a bond.

18. A liner according to claim 17 in which the bond is dissolvable in styrene.

19. A liner according to claim 13, in which the fibrous portion is arranged to melt at a lower temperature than the absorbent layer.

20. A liner according to claim 13 in which the fibrous portion is ribbed.

21. A liner according to claim 20 in which the ribs extend in the elongate direction of the liner.

22. A method of impregnating an inner absorbent layer of a hollow elongate liner with resin, the liner comprising an impervious layer, an inner absorbent layer and an elongate portion in which the impervious layer is an outer layer and in which the elongate portion is within the outer layer, the method comprising:

(A) removing air within the liner from one end region of the liner through the elongate portion extending along the liner such that resin located within the liner away from said one end region of the liner impregnates the absorbent layer, and (B) dissolving at least a part of the elongate portion in the resin.

23. A method according to claim 22 comprising causing relative movement of the resin and the liner such that the resin moves along relative to the liner towards said end region.

24. A method according to claim 22 in which the part that dissolves comprises a bond that hold the elongate portion together.

25. A method according to claim 22 wherein the elongate portion includes fibers and the fibers of the elongate portion are dissolved in the resin.

26. A method of lining a pipe, the method comprising:

(A) providing a hollow elongate liner comprising an impervious layer, an inner absorbent layer and an elongate portion in which the impervious layer is an outer layer and in which the elongate portion is within the outer layer, the elongate portion being pervious and having a greater resistance to compression than the absorbent layer;

(B) removing air within the liner from one end region of the liner through the elongate portion extending along the liner such that resin located within the liner away from said one end region of the liner impregnates the absorbent layer;

(C) dissolving at least a part of the elongate portion in the resin to reduce the thickness of the elongate portion; and (D) inserting the liner into a pipe.

27. A method of lining a pipe comprising:

(A) providing a hollow elongate liner including an outer impervious layer, an inner absorbent layer and an elongate portion, the elongate portion extending along the liner within the impervious layer, the elongate portion being pervious and having a greater resistance to compression than the absorbent layer and at least part of the elongate portion being dissolvable in styrene;

(B) removing air from within the liner from one end region of the liner through the elongate portion such that resin located within the liner away from said one end region of the liner impregnates the absorbent layer;

(C) inserting the liner into the pipe; and (D) reducing the thickness of the elongate portion after inserting the liner into the pipe, by melting the elongate portion.

28. A method according to claim 27 comprising reducing the thickness of the elongate portion by pressure.

29. A method according to claim 27 comprising reducing the thickness of the elongate portion by weakening resistance of the elongate portion to pressure by heating.

30. A method according to claim 27 comprising chemically dissolving the elongate portion to reduce the thickness of the elongate portion.

* * * * *